US011138165B2

(12) United States Patent
Horn et al.

(10) Patent No.: US 11,138,165 B2
(45) Date of Patent: Oct. 5, 2021

(54) COST HEURISTIC FOR FILTER EVALUATION

(71) Applicant: SAP SE, Walldorf (DE)

(72) Inventors: Oliver Horn, Nussloch (DE); Marius Eich, Neustadt (DE)

(73) Assignee: SAP SE, Walldorf (DE)

( * ) Notice: Subject to any disclaimer, the term of this patent is extended or adjusted under 35 U.S.C. 154(b) by 189 days.

(21) Appl. No.: 16/375,008

(22) Filed: Apr. 4, 2019

(65) Prior Publication Data

US 2020/0320048 A1 Oct. 8, 2020

(51) Int. Cl.
*G06F 17/00* (2019.01)
*G06F 16/21* (2019.01)
*G06F 16/22* (2019.01)
*G06F 16/2453* (2019.01)

(52) U.S. Cl.
CPC ........ *G06F 16/217* (2019.01); *G06F 16/2291* (2019.01); *G06F 16/24545* (2019.01); *G06F 16/24549* (2019.01)

(58) Field of Classification Search
None
See application file for complete search history.

(56) References Cited

U.S. PATENT DOCUMENTS

| | | | | |
|---|---|---|---|---|
| 6,615,203 B1* | 9/2003 | Lin | ................... | G06F 16/24542 |
| 7,984,043 B1* | 7/2011 | Waas | ................. | G06F 16/8358 |
| | | | | 707/718 |
| 2004/0220904 A1* | 11/2004 | Finlay | ................. | G06F 16/2456 |
| 2008/0114803 A1* | 5/2008 | Chinchwadkar | ..... | G06F 16/8365 |
| 2009/0259644 A1* | 10/2009 | Scheuermann | ... | G06F 16/24542 |
| 2014/0317087 A1* | 10/2014 | Collins | ............... | G06F 16/2255 |
| | | | | 707/715 |
| 2015/0234888 A1* | 8/2015 | Ahmed | ............. | G06F 16/24535 |
| | | | | 707/765 |
| 2015/0286681 A1* | 10/2015 | Baer | ................. | G06F 16/24554 |
| | | | | 707/754 |
| 2016/0055210 A1* | 2/2016 | Beavin | ............. | G06F 16/24553 |
| | | | | 707/754 |
| 2016/0140174 A1* | 5/2016 | Weyerhaeuser | .. | G06F 16/24542 |
| | | | | 707/718 |
| 2016/0350371 A1* | 12/2016 | Das | ...................... | G06F 16/2365 |
| 2017/0116335 A1* | 4/2017 | Baby | ................... | H04L 67/2814 |
| 2018/0276275 A1* | 9/2018 | Dou | ...................... | G06F 16/284 |
| 2018/0341678 A1* | 11/2018 | Moerkotte | ........ | G06F 16/24545 |
| 2019/0114294 A1* | 4/2019 | Shearer | ............ | G06F 16/24564 |

* cited by examiner

*Primary Examiner* — Hasanul Mobin
(74) *Attorney, Agent, or Firm* — Mintz Levin Cohn Ferris Glovsky and Popeo, P.C.

(57) ABSTRACT

A method, a system, and a computer program product for executing a query. A query plan for execution of a query is generated. The query requires access to at least one table stored in a database system. The query includes one or more filter predicates. A filter predicate in the one or more filter predicates is selected. For the selected filter predicate, a plurality of cost function values associated executing a filter evaluation of the selected filter predicate are determined. Filter evaluation of the selected predicate is executed in accordance with at least one determined cost function value in the plurality of cost function values.

18 Claims, 5 Drawing Sheets

COST HEURISTIC FOR FILTER EVALUATION

TECHNICAL FIELD

This disclosure relates generally to data processing and, in particular, to query execution, as well as analysis of query filtering mechanism.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance, including addressing responses to queries implementing analysis of query filters.

SUMMARY

In some implementations, the current subject matter relates to a computer implemented method for executing a query. The method may include generating a query plan for execution of a query, the query requiring access to at least one table stored in a database system, the query including one or more filter predicates, selecting a filter predicate in the one or more filter predicates, determining, for the selected filter predicate, a plurality of cost function values associated executing a filter evaluation of the selected filter predicate, and executing the filter evaluation of the selected predicate in accordance with at least one determined cost function value in the plurality of cost function values.

In some implementations, the current subject matter can include one or more of the following optional features. In some implementations, execution of the filter evaluation may further include executing the filter evaluation of the selected predicate in accordance with the determined cost function value and at least one previous result of the filter evaluation.

In some implementations, the plurality of cost function values may be determined using at least one of the following: a dictionary scan of the at least one table, a data vector scan of the at least one table, a data vector lookup of the at least one table, an index lookup of the at least one table, a dictionary lookup of the at least one table, and any combination thereof. Further, the plurality of cost function values may be determined using at least one of the following combinations: the dictionary scan and the data vector scan, the dictionary scan and the data vector lookup, the dictionary scan and the index lookup, and the data vector lookup and the dictionary lookup.

In some implementations, the query may be executed by a database execution engine and the query may be received from an application separate from the database execution engine. The query may be executed in accordance with the query plan optimized by the database execution engine.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
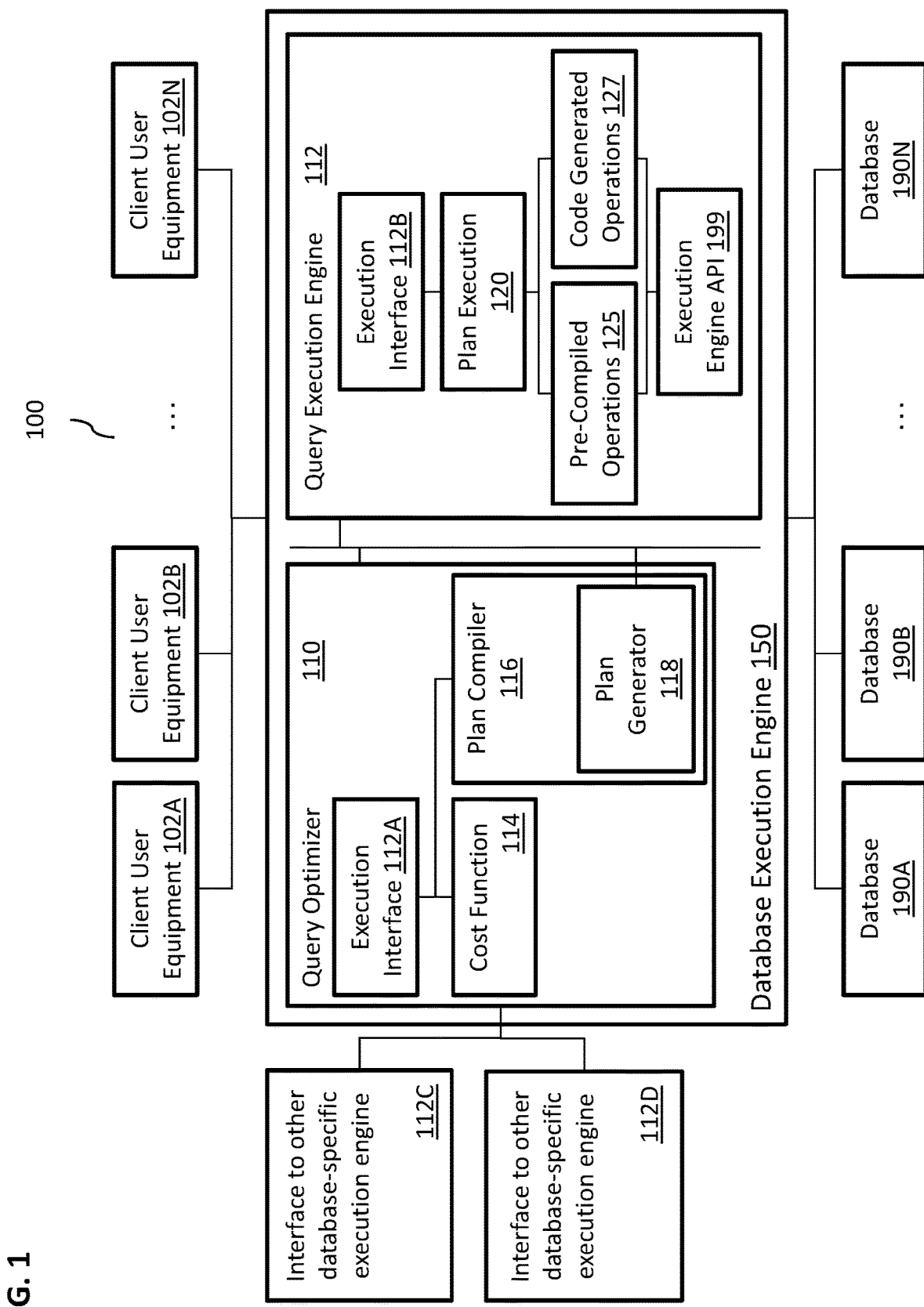
FIG. 1 illustrates an exemplary block diagram for a system, according to some implementations of the current subject matter.

To address these and potentially other deficiencies of currently available solutions, one or more implementations of the current subject matter relate to methods, systems, articles of manufacture, and the like that can, among other possible advantages, provide an ability to perform query execution planning, including determination of associated cost heuristics for evaluation of query filters.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 illustrates an exemplary system 100, in accordance with some example implementations. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a column "X" for the value ID (or valueID or valueid or ValueID, which hereinafter, will be used interchangeably) of "1" and an indexvector scan (or data vector scan, which will be used interchangeably herein) with a valueid obtained from the dictionary look up, which results in a document ID (or documentID or documentid or docid, which hereinafter, will be used interchangeably) list that identifies one or more rows in the table 1. Then for each document ID, a call is made via 199 to look up the value IDs for columns A and B. The value IDs may be used to look up dictionary values to materialize, the columns A and B including the actual data values for those columns.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

In some implementations, queries use predicates to select and/or filter data in a table using various values that may be assigned to the predicates. A predicate may define a logical condition that may be applied to rows in a table. A predicate may be included in clauses, functions, and expressions in query statements (e.g., SQL queries). It returns true, false, or unknown. In some implementations, a predicate may be used in a search condition of a WHERE clause, a HAVING clause, a SELECT clause, a join condition of FROM clauses, and/or any other constructs where a Boolean value may be used.

In some implementations, the current subject matter system may be configured to perform analysis of filtering predicates in queries to ensure that a most optimal (or even possible) filter evaluation mechanism is selected based on an accuracy of a cost function evaluation for such filter evaluation mechanism. Selection of a particular evaluation strategy may have a significant impact on an amount of compute resources and time that may be required to perform analysis of a specific query filter.

In some implementations, the current subject matter may determine and select among the following evaluation strat-

TABLE 1

| Operator | Calls Made On Database API |
|---|---|
| 1) TableScan (Filter X = 1) | dictionary lookup column "X" for the "value of ID of 1" |
| | indexvector scan with a valueid from the lookup, which results in a document ID (docid) list that identifies one or more rows in table "1" |
| 2) Materialization (Columns A, B) | for each docid, lookup value IDs (valueids) for columns A + B |
| | for the valueids, lookup dictionary value in dictionaries of A and B | egies: a dictionary scan (DictionaryScan) and a data vector scan (DataVectorScan), dictionary scan (DictionaryScan) and a data vector lookup (DataVectorLookup), dictionary scan (DictionaryScan) and index lookup (IndexLookup), and data vector lookup (DataVectorLookup) and dictionary lookup (DictionaryLookup).

In a dictionary scan, a dictionary may be used to find all valueIDs that may match a particular query predicate (e.g., a column, an operator, and/or any other query parameter (e.g., A=1)). Using an index lookup (if an index exists), the database system may read the data in the index directly and when it finds the data in the index that is being sought, the system may use addresses of the records in the index in the table and read only what is required. Because an index is ordered, an index lookup may read less data and hence, involve less compute resources than the table scan, even though the actual data is still obtained from the table after completion of the search (assume other data, besides the index, is being sought).

Figure 2:
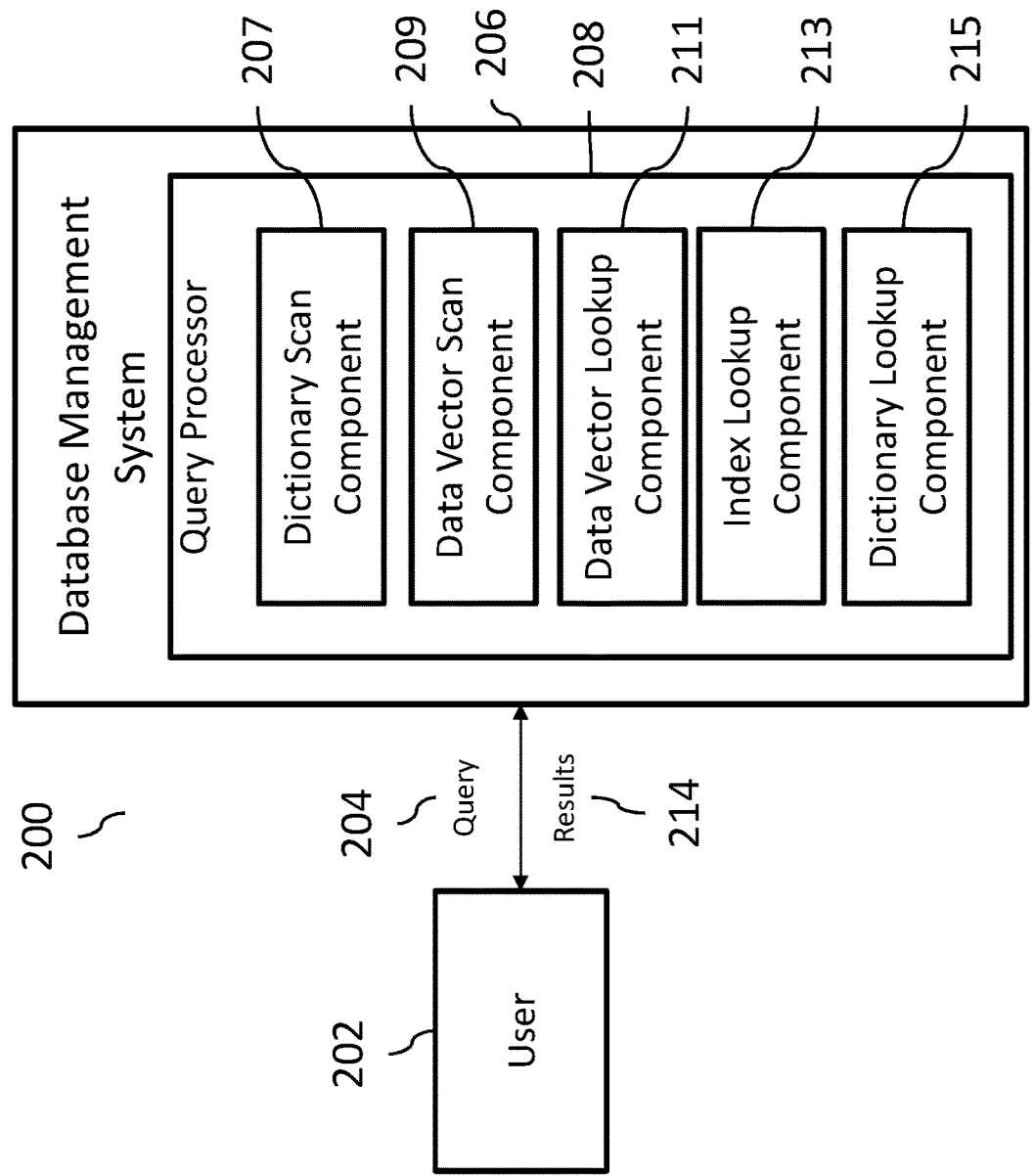
FIG. 2 illustrates an exemplary system for execution of a query, according to some implementations of the current subject matter.

FIG. 2 illustrates an exemplary system 200 for execution of a query, according to some implementations of the current subject matter. The system 200 may be incorporated into the system 100 shown in FIG. 1. The system 200 may include a database management system 206 that may include a query processor 208 that may perform execution of queries 204 submitted by a user 202.

The query processor 208 may include a dictionary scan component 207, a data vector scan component 209, a data vector lookup component 211, an index lookup component 213, and a dictionary lookup component 215.

Components and/or users of the system 200 may be any type of hardware, software, and/or any combination of both. A component of the system 200 may further include entire computing systems that may have its own libraries, user interface elements, deployment parameters and/or systems, lifecycles, operation and support processes, etc. Each of the user 202, system 204, processor 208, etc. databases may be any type of computing systems, computing components, software, hardware, cloud computing systems, etc., and/or any combination thereof. For example, the system 200 may be implemented in various in-memory database systems, such as a High Performance Analytic Appliance ("HANA") system as developed by SAP SE, Walldorf, Germany.

In some implementations, the components of the system 200 may be communicatively coupled using any type of communication connection, which may include, but is not limited to, wired, wireless, and/or a combination of both network(s). The networks may include various local area networks (LAN), wide area networks (WAN), metropolitan area networks (MAN), virtual private networks (VPN), virtual local area networks (VLAN), and/or any combination thereof.

In some implementations, the system 200 may be configured to analyze a query plan and, in particular, evaluate filter predicates contained in the query for data searching purposes using one or more or any predetermined combination (as discussed herein) of the components 207-215. Based on the evaluation of the filtering components, a cost function may be determined for each combination of the searching strategies that may be implemented using one or more (or any predetermined combination of) components 207-215. Using the results of the cost function, an appropriate data searching strategy may be selected in a most cost-effective manner (e.g., consuming fewer compute resources, requiring less time to generate results 214, etc.).

The following provides a discussion of the above filter evaluation strategies implemented by the current subject matter system that may be selected based on an outcome of a computation of their effectiveness. In particular, a filter evaluation strategy may be selected whenever a query includes conjunction (AND) operator between at least two predicates, as illustrated by the following examples:

WHERE A=1 AND B=2

WHERE A='hello' AND B=123 OR A='world' AND B=456

In the second example above, a separate filter evaluation strategy may need to be determined for each of the two AND operators. In addition to the determination of cost functions, one or more heuristic parameters (e.g., previously obtained results, etc.) may be used when selecting a particular filter evaluation strategy. For example, predicates in a conjunction may be ordered by selectivity, and hence, for each predicate a cost function may be determined using any of the above filter evaluation strategies and most cost-effective strategy may be selected for each such predicate. Further, selectivity of one predicate versus another predicate (e.g., first predicate above may be providing an additional input to the second predicate) may affect cost functions determination for the filter evaluation strategies.

In some implementations, the following parameters may be used when computing a cost function for a particular filter evaluation strategy:

δ=distinct value count of a column (>0)

ρ=row count of a table (>0)

σ=selectivity of a predicate (between 0.0 and 1.0)

φ=selectivity of previous predicate (if applicable otherwise 1.0) (between 0.0 and 1.0), and $w_x$=weight or coefficient (determined by measurements).

DictionaryScan and DataVectorScan (DS&DVS) Filter Evaluation Strategy

Using the dictionary scan component 207 (as shown in FIG. 2), the system 200 may scan a dictionary to find all ValueIDs that match a particular predicate (e.g., a column, a query operator, a particular query parameter (e.g., A=1), etc.). Then, the system 200 may use data vector scan component 209 to scan the data vector to find all rows that match those ValueIDs. Dictionary scans on fixed or variable size columns may be executed by the dictionary scan component 207 as follows:

dictionary scan by binary search on fixed size column:

$$C_{DS_{BS_{FS}}}(\delta) = w_{DS_{BS_{FS}}} * \log_2(\delta) \qquad (1)$$

dictionary scan by binary search on variable size column:

$$C_{DS_{BS_{VS}}}(\delta) = w_{DS_{BS_{VS}}} * \log_2(\delta) \qquad (2)$$

dictionary scan by scan on variable size column:

$$C_{DS_{S_{VS}}}(\delta) = w_{DS_{S_{VS}}} * \delta \qquad (3)$$

Dictionary scans for specific query predicate operators (e.g., EQ (equal), NE (not equal), LT (less than), LE (less than or equal), GT (greater than), GE (greater than or equal to), BT (between), NB (not between), IN (in), NL/NN (null/not null)) may be executed by the dictionary scan component 207 as follows:

Branch mispredictions during execution of queries may be accounted for using the following expression:

$$C_{BMP}(\rho,\sigma)=\rho*\sigma*(1-\sigma) \quad (11)$$

Branch misprediction during the data vector scan may be expressed as follows:

$$C_{BMP_{DVS}}(\rho, \sigma) = w_{BMP_{DVS}} * \begin{cases} 2*C_{BMP}(\rho, \sigma) & \text{if predicate is }==, \geq, >, <, \leq, \text{IS NULL, NOT IS NULL or BETWEEN} \\ 4*C_{BMP}(\rho, \sigma) & \text{if predicate is NOT BETWEEN} \\ \lambda*C_{BMP}(\rho, \sigma) & \text{if predicate is IN} \\ \ldots \end{cases} \quad (12)$$

Dictionary Scan for EQ, NE, LT, LE, GT, GE:

$$C_{DS_{EQ}}(\delta) = \begin{cases} C_{DS_{BS_{FS}}}(\delta) & \text{if column is fixed size type} \\ C_{DS_{BS_{VS}}}(\delta) & \text{if column is not fixed size type} \end{cases} \quad (4)$$

dictionary scan for BT:

$$C_{DS_{BT}}(\delta)=2*C_{DS_{EQ}}(\delta) \quad (5)$$

Dictionary Scan for NB:

$$C_{DS_{NB}}(\delta) = \begin{cases} 2*C_{DS_{BS_{FS}}}(\delta) & \text{if column is fixed size type} \\ 2*C_{DS_{S_{VS}}}(\delta) & \text{if column is not fixed size type} \end{cases} \quad (6)$$

Dictionary Scan for IN:

$$C_{DS_{IN}}(\delta)=\lambda*C_{DS_{EQ}}(\delta)(\lambda=\# \text{ of inlist parameters}) \quad (7)$$

Dictionary Scan for NL/NN:

$$C_{DS_{NL}}(\delta)=0.0 \quad (8)$$

In view of the equations (1)-(8) above, the dictionary scan component 207 may determine that the cost function for a particular predicate may be determined as follows $$C_{DS}(\delta) = \begin{cases} C_{DS_{EQ}}(\delta) & \text{if predicate is }==, <>, \geq, >, < \text{ or } \leq \\ C_{DS_{BT}}(\delta) & \text{if predicate is BETWEEN} \\ C_{DS_{NB}}(\delta) & \text{if predicate is NOT BETWEEN} \\ C_{DS_{IN}}(\delta) & \text{if predicate is IN} \\ C_{DS_{NL}}(\delta) & \text{if predicate is IS NULL or NOT IS NULL} \\ \ldots \end{cases} \quad (9)$$

The data vector scan may be executed by the data vector scan component 209 of the system 209 in accordance with the following:

$$C_{DVS}(\rho)=w_{DVS}*\rho \quad (10)$$

The system 200 may then determine how to handle results during the data vector scan using the following:

$$C_{RH_{DVS}}(\rho,\sigma)=w_{RH_{DVS}}*\rho*\sigma \quad (13)$$

Thus, in view of the equations (1)-(13), the complete cost function that takes into account the dictionary scan performed by the component 207 and the data vector scan performed by the component 209 may be expressed as follows:

$$C_{DS \& DVS}(\delta, \rho, \sigma) = \begin{cases} C_{DS}(\delta) & \text{if } \sigma = 0 \\ C_{DS}(\delta) + \varphi*(C_{DVS}(\rho) + C_{BMP_{DVS}}(\rho, \sigma) + C_{RH_{DVS}}(\rho, \sigma)) & \text{if } \sigma > 0 \end{cases} \quad (14)$$

Thus, if the selectivity of a predicate (i.e., σ) is 0, the cost function of the dictionary scan and data vector scan corresponds to the cost function of the dictionary scan, as expressed in equation (9) above. Otherwise, if the selectivity of the predicate is greater than 0, the cost function of the two strategies is expressed as a combination of the cost functions of the dictionary scan (equation (9)), the data vector scan cost function (equation (10)), the cost functions of branch mispredictions (equations (11) and (12)), and the result handling cost function (equation (13)), where the latter four cost functions are offset by the selectivity parameter of a previous predicate, if applicable.

DictionaryScan and DataVectorLookup (DS&DVL) Filter Evaluation Strategy

Using this strategy, the system 200 may use one or more existing previous results of rows and perform DataVectorLookup analysis (which may be performed by the component 211), instead of the DataVectorScan analysis discussed above. For example, the system 200 may process filter WHERE A=1 AND B=2 and may evaluate A=1 using dictionary scan component 207 and data vector scan component 209, as discussed above, and may use the outcome of that as additional input for evaluation of B=2. Instead of scanning through all rows of a table on the data vector of column B, the system 200 may lookup the rows that matched A=1 and check if the ValueID on each row is in the set of ValueIDs determined by the dictionary scan on column B. In some implementations, cost function evaluation analysis performed in connection with the dictionary scan and data vector scan filter evaluation strategy discussed above may be applicable in connection with the dictionary scan and data vector lookup filter evaluation strategy.

DictionaryScan and IndexLookup (DS&IL) Filter Evaluation Strategy

In some implementations, the system 200 uses component 207 to perform the dictionary scan in accordance with the discussion above, and component 213 to perform an index lookup. The index (if one exists) may allow a determination, for each ValueID, the rows on which this ValueID appears. Hence, by executing index lookups, all matching rows for the found ValueIDs may be determined after performing the dictionary scan.

In some implementations, the index lookup (fully inverted) may be determined in accordance with the following:

$$C_{IL}(\delta,\sigma)=w_{IL}*\delta*\sigma \quad (15)$$

The index lookup component 213 may also determine a result sort from the index lookup using the following:

$$C_{SR_{IL}}(\rho, \sigma) = \begin{cases} 0 \text{ if } \rho*\sigma = 0 \\ w_{SR_{IL}}*\rho*\sigma*\log_2(p*\sigma) \text{ if } \rho*\sigma > 0 \end{cases} \quad (16)$$

During index lookup, results may be handled in accordance with the following:

$$C_{RH_{IL}}(\rho,\sigma)=w_{RH_{IL}}*\rho*\sigma \quad (17)$$

Thus, in view of the equations (1)-(17), the complete cost function that takes into account the dictionary scan performed by the component 207 and the index lookup performed by the component 213 may be expressed as follows:

$$C_{DS \& IL}(\delta, \rho, \sigma) = \begin{cases} C_{DS}(\delta) \text{ if } \sigma = 0 \\ C_{DS}(\delta) + C_{IL}(\delta, \sigma) + C_{SR_{IL}}(\rho, \sigma) + C_{RH_{IL}}(\rho, \sigma) \text{ if } \sigma > 0 \end{cases} \quad (18)$$

DataVectorLookup and DictionaryLookup (DVL&DL) Filter Evaluation Strategy

In some implementations, the system 200 may implement the data vector lookup component 211 and dictionary lookup component 215 for the purposes of evaluation of query filters. In this case, a previous result of evaluation may be needed as a precondition. In the example WHERE A=1 AND B=2, filter condition B=2 may be evaluated without performing a dictionary scan. The system 200 may perform a lookup of each row from the previous result in the data vector to determine the ValueID, then perform a lookup of the dictionary using the determined ValueID and ascertain the value. Then, the system 200 may evaluate if the ascertained value matches the predicate B=2 and if not, the row may be removed from the previous result.

In some implementations, the data vector lookup component 211 maybe executed in accordance with the following:

$$C_{DVL}(\rho)=w_{DVL}*\rho \quad (19)$$

The dictionary lookup component 215 may be executed in accordance with the following:

$$C_{DL}(\delta,\rho)=w_{DL}*\rho*\delta \quad (20)$$

In some implementations, execution of components 211 and 215 may be dependent on value materialization expressed as follows:

$$C_{MAT}(\delta, \rho) = \begin{cases} 0 \text{ if column is fixed size type} \\ w_{MAT_A}*\rho*\delta^{w_{MAT_B}} \text{ if column is not fixed size type} \end{cases} \quad (21)$$

Expression evaluation may be influenced by branch misprediction expressed as follows:

$$C_{BMP_{EE_1}}(\rho, \sigma) = \begin{cases} w_{BMP_{EE_{FS}}}*C_{BMP}(\rho, \sigma) \text{ if column is fixed size type} \\ w_{BMP_{EE_{VS}}}*C_{BMP}(\rho, \sigma) \text{ if column is not fixed size type} \end{cases} \quad (22)$$

Branch misprediction may depend on predicate type as follows:

$$C_{BMP_{EE}}(\rho, \sigma) = \begin{cases} C_{BMP_{EE_1}}(\rho, \sigma) \text{ if predicate is } ==, <>, \geq, >, <, \leq, \text{IS NULL or NOT IS NULL} \\ 2*C_{BMP}(\rho, \sigma) \text{ if predicate is BETWEEN or NOT BETWEEN} \\ \lambda*C_{BMP_{EE_1}}(\rho, \sigma) \text{ if predicate is IN} \\ \cdots \end{cases} \quad (23)$$

A complete cost function for data vector lookup and dictionary lookup operations may be expressed as follows:

$$C_{DVL\ \&\ DL}(\delta,\rho,\sigma)=\varphi*(C_{DVL}(\rho)+C_{DL}(\delta,\rho)+C_{MAT}(\delta,\rho)+C_{BMP_{EE}}(\rho,\sigma)) \quad (24)$$

Figure 3:
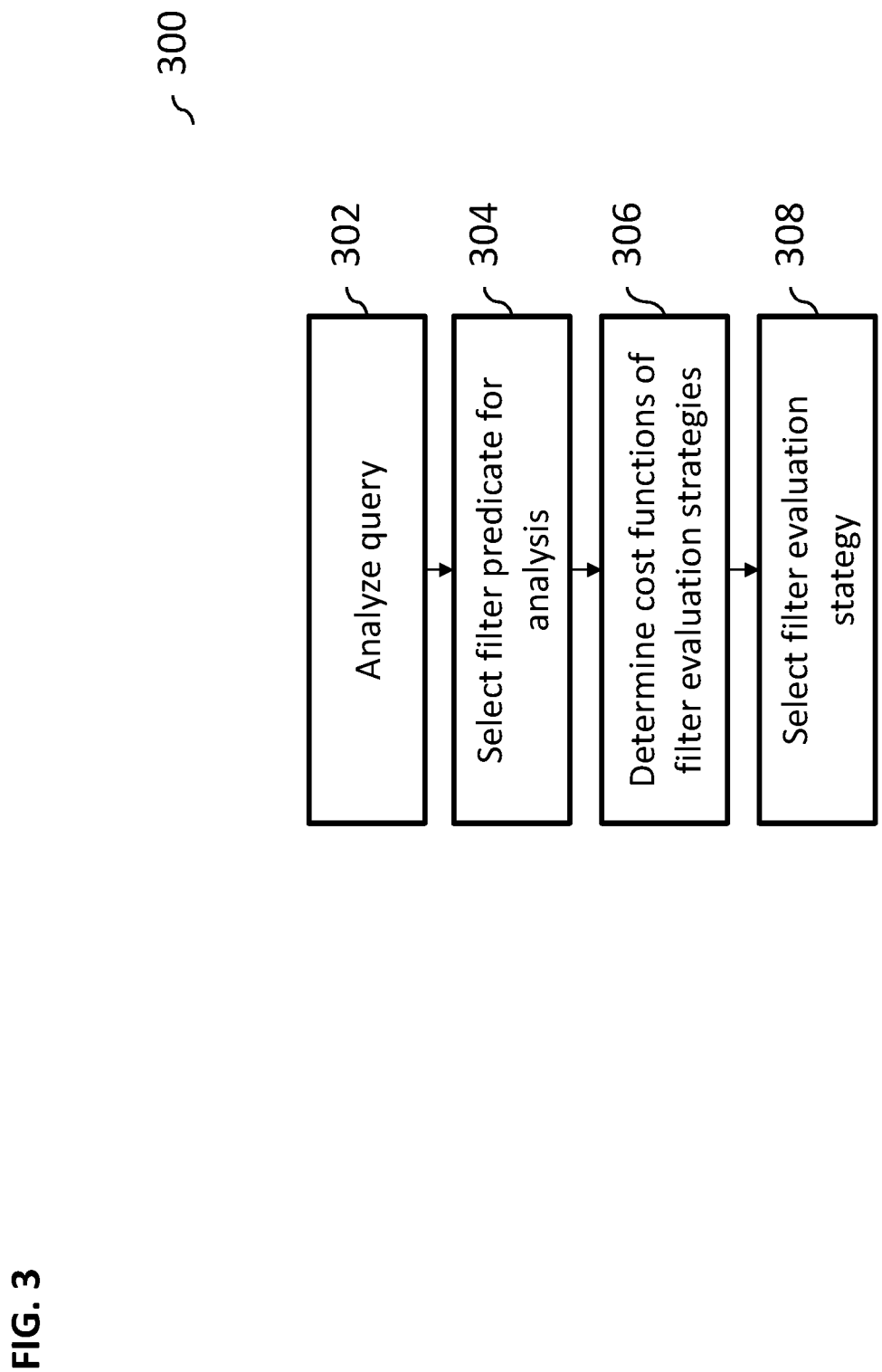
FIG. 3 illustrates an exemplary process for executing queries that may be performed by the system shown in FIG. 2, according to some implementations of the current subject matter.

FIG. 3 illustrates an exemplary process 300 for executing queries that may be performed by the system 200 shown in FIG. 2, according to some implementations of the current subject matter. At 302, a query and its predicates may be analyzed. At 304, a filter predicate or a query clause may be selected for the purposes of performing analysis of a particular filter. At 306, cost functions may be computed by one or more of the dictionary scan component 207, data vector scan component 209, data vector lookup component 211, index lookup component 213, and/or dictionary lookup component 215 using equations (1)-(24). The cost functions of combinations of various filter evaluation strategies may be determined, as discussed above, and compared. Based on the comparison of the strategies, the most effective (e.g., less compute-intensive, less time-consuming, etc.) strategy may be selected, at 308, for analysis of a filter condition. In some implementations, prior results may also be taken into account to select an appropriate strategy.

Figure 4:
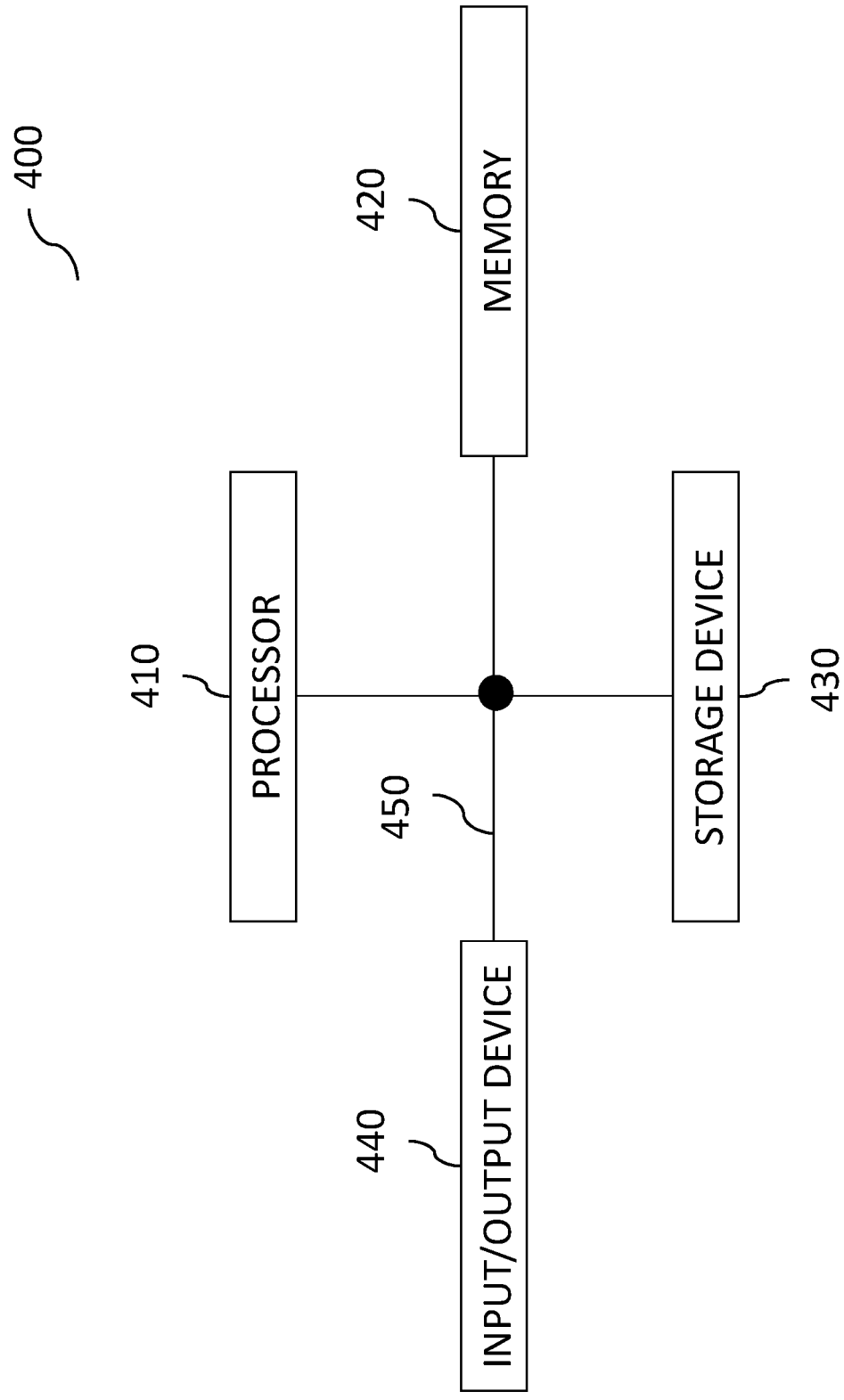
FIG. 4 is an exemplary system, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

Figure 5:
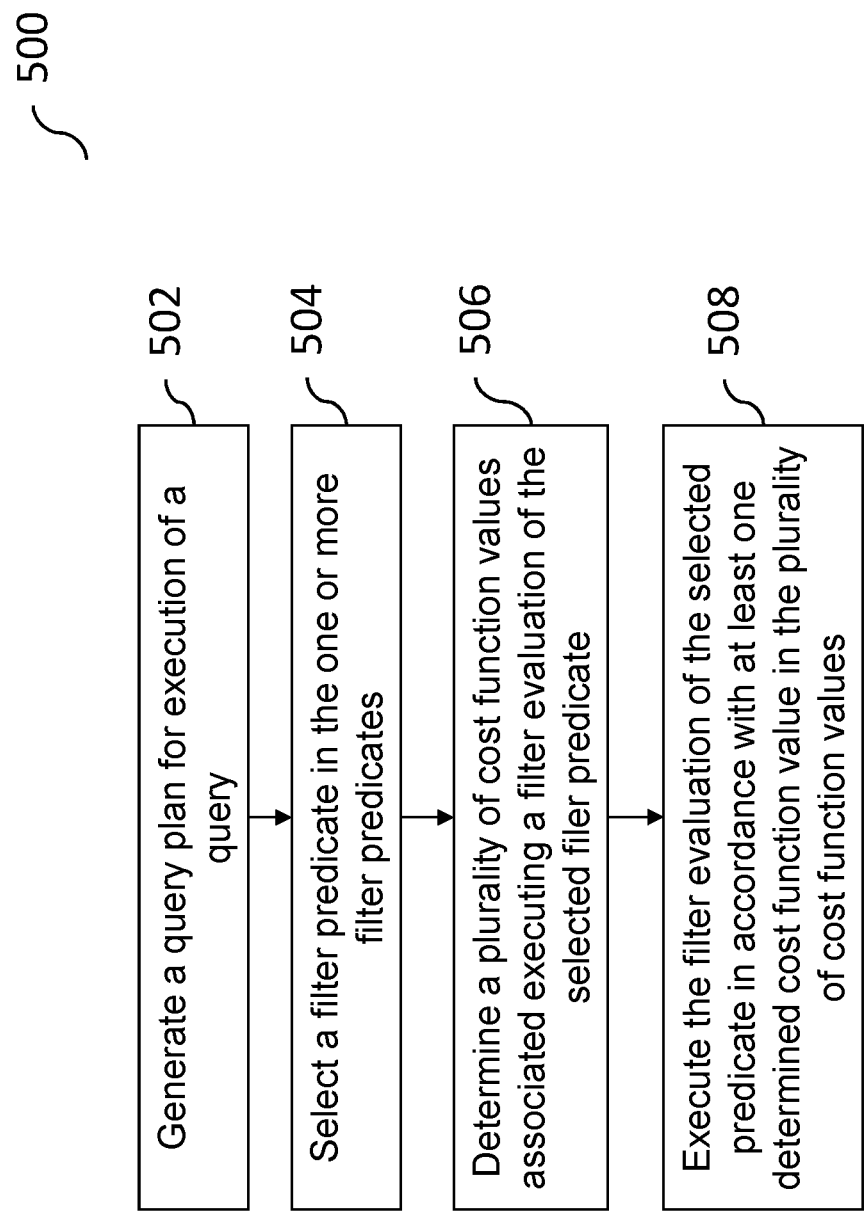
FIG. 5 is an exemplary method, according to some implementations of the current subject matter.

FIG. 5 illustrates an exemplary method 500 for executing a query in a database system, according to some implementations of the current subject matter. At 502, a query plan for execution of a query may be generated. The query may require access to at least one table stored in a database system. The query including one or more filter predicates. At 504, a filter predicate in the query may be selected for evaluation. At 506, for the selected filter predicate, a plurality of cost function values associated executing a filter evaluation of the selected filter predicate may be determent (e.g., in accordance with equations (1)-(24) above). At 508, filter evaluation of the selected predicate in accordance with the determined cost function value in the plurality of cost function values may be executed.

In some implementations, the current subject matter can include one or more of the following optional features. In some implementations, execution of the filter evaluation may further include executing the filter evaluation of the selected predicate in accordance with the determined cost function value and at least one previous result of the filter evaluation.

In some implementations, the plurality of cost function values may be determined using at least one of the following: a dictionary scan of the at least one table, a data vector scan of the at least one table, a data vector lookup of the at least one table, an index lookup of the at least one table, a dictionary lookup of the at least one table, and any combination thereof. Further, the plurality of cost function values may be determined using at least one of the following combinations: the dictionary scan and the data vector scan, the dictionary scan and the data vector lookup, the dictionary scan and the index lookup, and the data vector lookup and the dictionary lookup.

In some implementations, the query may be executed by a database execution engine and the query may be received from an application separate from the database execution engine. The query may be executed in accordance with the query plan optimized by the database execution engine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    generating, using a query optimizer component, a query plan for execution of a query, the query requiring access to at least one table stored in a database system, the query including one or more filter predicates for filtering data stored in the at least one table, a query plan compiler component compiling the generated query plan, the generated query plan including at least one of a pre-compiled code selected for at least one operation of the query and a just-in-time code generated for execution of at least one operation of the query, the query optimizer component selecting at least one execution engine configured to support the database system for execution of the query on the database system;
    selecting a filter predicate in the one or more filter predicates;
    determining, for the selected filter predicate, a plurality of cost function values associated with executing a filter evaluation of the selected filter predicate; and
    executing, using the selected execution engine, the filter evaluation of the selected predicate in accordance with at least one determined cost function value in the plurality of cost function values, the at least one determined cost function value includes a cost function value of a branch misprediction during execution of the query determined using at least one of a row count of the at least one table and a selectivity of the filter predicate.

2. The method according to claim 1, wherein the executing the filter evaluation further comprises executing the filter evaluation of the selected predicate in accordance with the at least one determined cost function value and at least one previous result of the filter evaluation.

3. The method according to claim 1, wherein the plurality of cost function values are determined using at least one of the following: a dictionary scan of the at least one table, a data vector scan of the at least one table, a data vector lookup of the at least one table, an index lookup of the at least one table, a dictionary lookup of the at least one table, and any combination thereof.

4. The method according to claim 3, wherein the plurality of cost function values are determined using at least one of the following combinations: the dictionary scan and the data vector scan, the dictionary scan and the data vector lookup, the dictionary scan and the index lookup, and the data vector lookup and the dictionary lookup.

5. The method according to claim 1, wherein the query is executed by a database execution engine and the query is received from an application separate from the database execution engine.

6. The method according to claim 5, wherein the query is executed in accordance with the query plan optimized by the database execution engine.

7. A system comprising:
at least one programmable processor; and
a non-transitory machine-readable medium storing instructions that, when executed by the at least one programmable processor, cause the at least one programmable processor to perform operations comprising:
generating, using a query optimizer component, a query plan for execution of a query, the query requiring access to at least one table stored in a database system, the query including one or more filter predicates for filtering data stored in the at least one table, a query plan compiler component compiling the generated query plan, the generated query plan including at least one of a pre-compiled code selected for at least one operation of the query and a just-in-time code generated for execution of at least one operation of the query, the query optimizer component selecting at least one execution engine configured to support the database system for execution of the query on the database system;
selecting a filter predicate in the one or more filter predicates;
determining, for the selected filter predicate, a plurality of cost function values associated with executing a filter evaluation of the selected filter predicate; and
executing, using the selected execution engine, the filter evaluation of the selected predicate in accordance with at least one determined cost function value in the plurality of cost function values, the at least one determined cost function value includes a cost function value of a branch misprediction during execution of the query determined using at least one of a row count of the at least one table and a selectivity of the filter predicate.

8. The system according to claim 7, wherein the executing the filter evaluation further comprises executing the filter evaluation of the selected predicate in accordance with the at least one determined cost function value and at least one previous result of the filter evaluation.

9. The system according to claim 7, wherein the plurality of cost function values are determined using at least one of the following: a dictionary scan of the at least one table, a data vector scan of the at least one table, a data vector lookup of the at least one table, an index lookup of the at least one table, a dictionary lookup of the at least one table, and any combination thereof.

10. The system according to claim 9, wherein the plurality of cost function values are determined using at least one of the following combinations: the dictionary scan and the data vector scan, the dictionary scan and the data vector lookup, the dictionary scan and the index lookup, and the data vector lookup and the dictionary lookup.

11. The system according to claim 7, wherein the query is executed by a database execution engine and the query is received from an application separate from the database execution engine.

12. The system according to claim 11, wherein the query is executed in accordance with the query plan optimized by the database execution engine.

13. A computer program product comprising a non-transitory machine-readable medium storing instructions that, when executed by at least one programmable processor, cause the at least one programmable processor to perform operations comprising:
generating, using a query optimizer component, a query plan for execution of a query, the query requiring access to at least one table stored in a database system, the query including one or more filter predicates for filtering data stored in the at least one table, a query plan compiler component compiling the generated query plan, the generated query plan including at least one of a pre-compiled code selected for at least one operation of the query and a just-in-time code generated for execution of at least one operation of the query, the query optimizer component selecting at least one execution engine configured to support the database system for execution of the query on the database system;
selecting a filter predicate in the one or more filter predicates;
determining, for the selected filter predicate, a plurality of cost function values associated with executing a filter evaluation of the selected filter predicate; and
executing, using the selected execution engine, the filter evaluation of the selected predicate in accordance with at least one determined cost function value in the plurality of cost function values, the at least one determined cost function value includes a cost function value of a branch misprediction during execution of the query determined using at least one of a row count of the at least one table and a selectivity of the filter predicate.

14. The computer program product according to claim 13, wherein the executing the filter evaluation further comprises executing the filter evaluation of the selected predicate in accordance with the at least one determined cost function value and at least one previous result of the filter evaluation.

15. The computer program product according to claim 13, wherein the plurality of cost function values are determined using at least one of the following: a dictionary scan of the at least one table, a data vector scan of the at least one table, a data vector lookup of the at least one table, an index lookup of the at least one table, a dictionary lookup of the at least one table, and any combination thereof.

16. The computer program product according to claim 15, wherein the plurality of cost function values are determined using at least one of the following combinations: the dictionary scan and the data vector scan, the dictionary scan and the data vector lookup, the dictionary scan and the index lookup, and the data vector lookup and the dictionary lookup.

17. The computer program product according to claim 13, wherein the query is executed by a database execution engine and the query is received from an application separate from the database execution engine.

18. The computer program product according to claim 17, wherein the query is executed in accordance with the query plan optimized by the database execution engine.

\* \* \* \* \*